US011898967B2

(12) United States Patent
Kusters

(10) Patent No.: US 11,898,967 B2
(45) Date of Patent: Feb. 13, 2024

(54) PREDICTING MALFUNCTION AND FAILURE OF CENTRIFUGE UMBILICUS

(71) Applicant: Fenwal, Inc., Lake Zurich, IL (US)

(72) Inventor: Benjamin E. Kusters, Pleasant Prairie, WI (US)

(73) Assignee: Fenwal, Inc., Lake Zurich, IL (US)

( * ) Notice: Subject to any disclaimer, the term of this patent is extended or adjusted under 35 U.S.C. 154(b) by 60 days.

(21) Appl. No.: 17/572,716

(22) Filed: Jan. 11, 2022

(65) Prior Publication Data
US 2022/0244193 A1     Aug. 4, 2022

Related U.S. Application Data

(60) Provisional application No. 63/144,485, filed on Feb. 2, 2021.

(51) Int. Cl.
*G01N 21/90* (2006.01)
*G01N 21/88* (2006.01)
(Continued)

(52) U.S. Cl.
CPC ....... *G01N 21/9072* (2013.01); *B04B 5/0407* (2013.01); *B04B 13/00* (2013.01);
(Continued)

(58) Field of Classification Search
CPC .............. G01N 33/491; G01N 21/31; G01N 2201/062; G01N 21/59; G01N 2201/08; G01N 21/255; G01N 33/49; G01N 2035/00495; G01N 21/55; G01N 21/5907; G01N 2201/0612; G01N 2201/0636;
(Continued)

(56) References Cited

U.S. PATENT DOCUMENTS 3,727,066 A   4/1973   Louderback et al.
3,752,995 A   8/1973   Liedholz
(Continued)

FOREIGN PATENT DOCUMENTS

EP   0342730 A2   11/1989
EP   0771569 A2   5/1997
(Continued)

OTHER PUBLICATIONS

U.S. Appl. No. 10/561,784 B2, filed Feb. 18, 2020, Katz et al.

*Primary Examiner* — Michael P Stafira
(74) *Attorney, Agent, or Firm* — Cook Alex Ltd.

(57) ABSTRACT

An umbilicus-driven centrifuge includes a yoke configured to orbit a midsection of the umbilicus around a rotational axis at a first speed so as to cause a separation chamber associated with the umbilicus to rotate about the rotational axis at a second speed that is approximately double the first speed. An optical monitoring system directly monitors the separation chamber, with a light source oriented to emit light toward the separation chamber and a light detector oriented to receive at least a portion of the light after the light has passed through the separation chamber. A controller receives a plurality of signals from the light detector, then compares the period or frequency of the signals to an expected period or frequency. The controller determines that the umbilicus is experiencing an irregularity when the period or frequency is different from the expected period or frequency.

20 Claims, 6 Drawing Sheets

(51) Int. Cl.
  *B04B 13/00* (2006.01)
  *B04B 5/04* (2006.01)
  *G01N 21/01* (2006.01)

(52) U.S. Cl.
  CPC ......... *G01N 21/01* (2013.01); *G01N 21/8803* (2013.01); *G01N 21/9036* (2013.01); *G01N 2021/0187* (2013.01)

(58) Field of Classification Search
  CPC .. G01N 21/07; G01N 21/251; G01N 35/0092; G01N 21/3577; G01N 21/359; G01N 21/49; G01N 2201/061; G01N 33/48778; G01N 21/17; G01N 21/27; G01N 35/00584; G01N 2021/3181; G01N 21/51; G01N 15/042; G01N 15/05; G01N 2015/045; G01N 2021/0187; G01N 21/01; G01N 21/8803; G01N 21/9036; G01N 21/9072; B04B 5/0442; B04B 2005/045; B04B 13/00; B04B 2013/006; B04B 2005/0492; B04B 7/00; B04B 11/02; B04B 7/08; B04B 11/06; B04B 11/04; B04B 9/10; B04B 5/0407
  See application file for complete search history.

(56) References Cited

U.S. PATENT DOCUMENTS

| | | |
|---|---|---|
| 3,778,171 A | 12/1973 | Chervenka |
| 4,120,449 A | 10/1978 | Brown et al. |
| 4,409,820 A | 10/1983 | Nash |
| 4,468,219 A | 8/1984 | George et al. |
| 4,557,719 A | 12/1985 | Neumann et al. |
| 4,604,086 A | 8/1986 | Benko et al. |
| 4,810,090 A | 3/1989 | Boucher et al. |
| 5,104,526 A | 4/1992 | Brown et al. |
| 5,260,598 A | 11/1993 | Brass et al. |
| 5,298,476 A | 3/1994 | Hotta et al. |
| 5,316,666 A * | 5/1994 | Brown ............. B04B 13/00 250/237 G |
| 5,316,667 A | 5/1994 | Brown et al. |
| 5,362,291 A * | 11/1994 | Williamson, IV ........ B04B 7/02 494/12 |
| 5,400,261 A | 3/1995 | Reynolds |
| 5,437,598 A | 8/1995 | Antwiler |
| 5,514,069 A * | 5/1996 | Brown ............. B04B 5/0442 138/111 |
| 5,570,697 A | 11/1996 | Walker et al. |
| 5,573,678 A | 11/1996 | Brown et al. |
| 5,592,402 A | 1/1997 | Beebe et al. |
| 5,605,842 A | 2/1997 | Langley et al. |
| 5,611,997 A | 3/1997 | Langley et al. |
| 5,628,915 A | 5/1997 | Brown et al. |
| 5,632,893 A | 5/1997 | Brown et al. |
| 5,639,382 A | 6/1997 | Brown |
| 5,656,163 A | 8/1997 | Brown |
| 5,868,696 A | 2/1999 | Giesler et al. |
| 5,948,271 A | 9/1999 | Wardwell et al. |
| 5,958,250 A | 9/1999 | Brown et al. |
| 5,961,842 A | 10/1999 | Min et al. |
| 5,980,757 A | 11/1999 | Brown et al. |
| 5,980,760 A | 11/1999 | Min et al. |
| 6,063,292 A | 5/2000 | Leung |
| 6,254,784 B1 | 7/2001 | Nayak et al. |
| 6,312,607 B1 | 11/2001 | Brown et al. |
| 6,322,488 B1 * | 11/2001 | Westberg ............ A61M 1/0209 494/39 |
| 6,899,666 B2 | 5/2005 | Brown |
| 7,001,321 B1 * | 2/2006 | Brown ............. B04B 5/0442 494/44 |
| 7,327,443 B2 | 2/2008 | Scibona et al. |
| 7,355,685 B2 | 4/2008 | Scibona et al. |
| 7,422,693 B2 | 9/2008 | Carter et al. |
| 7,605,388 B2 | 10/2009 | Carter et al. |
| 7,951,059 B2 | 5/2011 | Sweat |
| 9,314,562 B2 | 4/2016 | Foley et al. |
| 9,594,020 B2 | 3/2017 | Koudelka et al. |
| 2002/0091057 A1 * | 7/2002 | Westberg ......... A61M 1/36225 494/45 |
| 2004/0082459 A1 * | 4/2004 | Min ............... A61M 1/362264 494/45 |
| 2004/0133086 A1 | 7/2004 | Ciurczak et al. |
| 2004/0151633 A1 | 8/2004 | De Gaulle |
| 2007/0239033 A1 | 10/2007 | Tearney et al. |
| 2008/0014181 A1 | 1/2008 | Ariff et al. |
| 2008/0041772 A1 | 2/2008 | Sweat et al. |
| 2008/0045394 A1 | 2/2008 | Kolenbrander et al. |
| 2009/0073456 A1 | 3/2009 | Wax et al. |
| 2009/0129976 A1 | 5/2009 | Hoshino et al. |
| 2011/0058070 A1 | 3/2011 | Awazu |
| 2011/0143905 A1 | 6/2011 | Kolenbrander et al. |
| 2012/0190945 A1 | 7/2012 | Yamanaka et al. |
| 2014/0008277 A1 | 1/2014 | Foley et al. |
| 2014/0030729 A1 | 1/2014 | Basiji et al. |
| 2014/0045668 A1 | 2/2014 | Case et al. |
| 2018/0344920 A1 * | 12/2018 | Katz ............... A61M 1/362265 |
| 2019/0369008 A1 * | 12/2019 | Kusters ............. A61B 5/14546 |

FOREIGN PATENT DOCUMENTS

| | | | |
|---|---|---|---|
| EP | 0779077 A1 | 6/1997 | |
| WO | WO 96/40319 A1 | 12/1996 | |
| WO | WO-9640440 A1 * | 12/1996 | |
| WO | WO-0128652 A1 * | 4/2001 | ............ A61M 1/302 |
| WO | WO 03/000026 A2 | 1/2003 | |
| WO | WO 03/026724 A1 | 4/2003 | |
| WO | WO 2008/021633 A2 | 2/2008 | |
| WO | WO 2008/114164 A1 | 9/2008 | |
| WO | WO-2013048984 A1 * | 4/2013 | ......... A61M 1/0209 |
| WO | WO 2014/039091 A1 | 3/2014 | |
| WO | WO 2018/053217 A1 | 3/2018 | |

\* cited by examiner

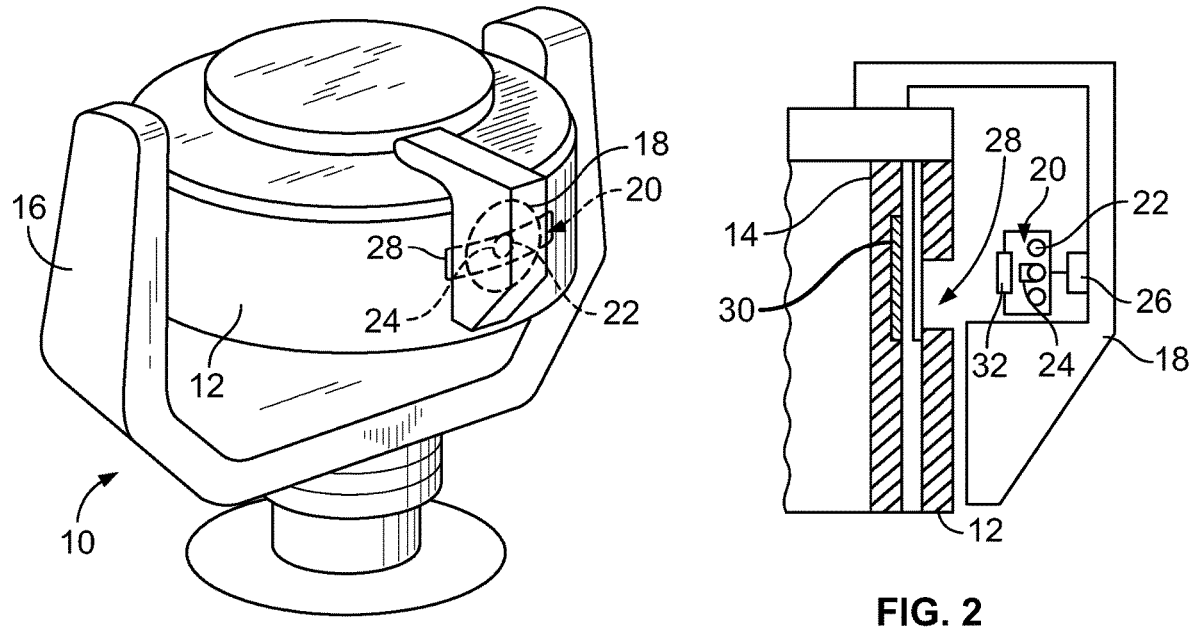
FIG. 1
FIG. 2
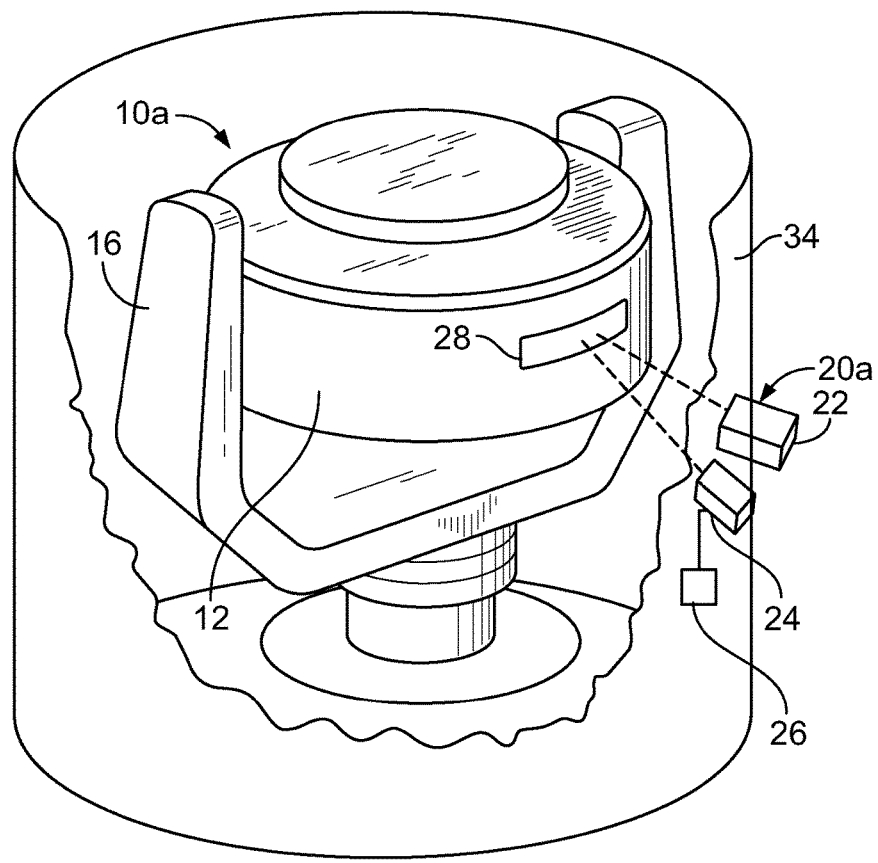
FIG. 3

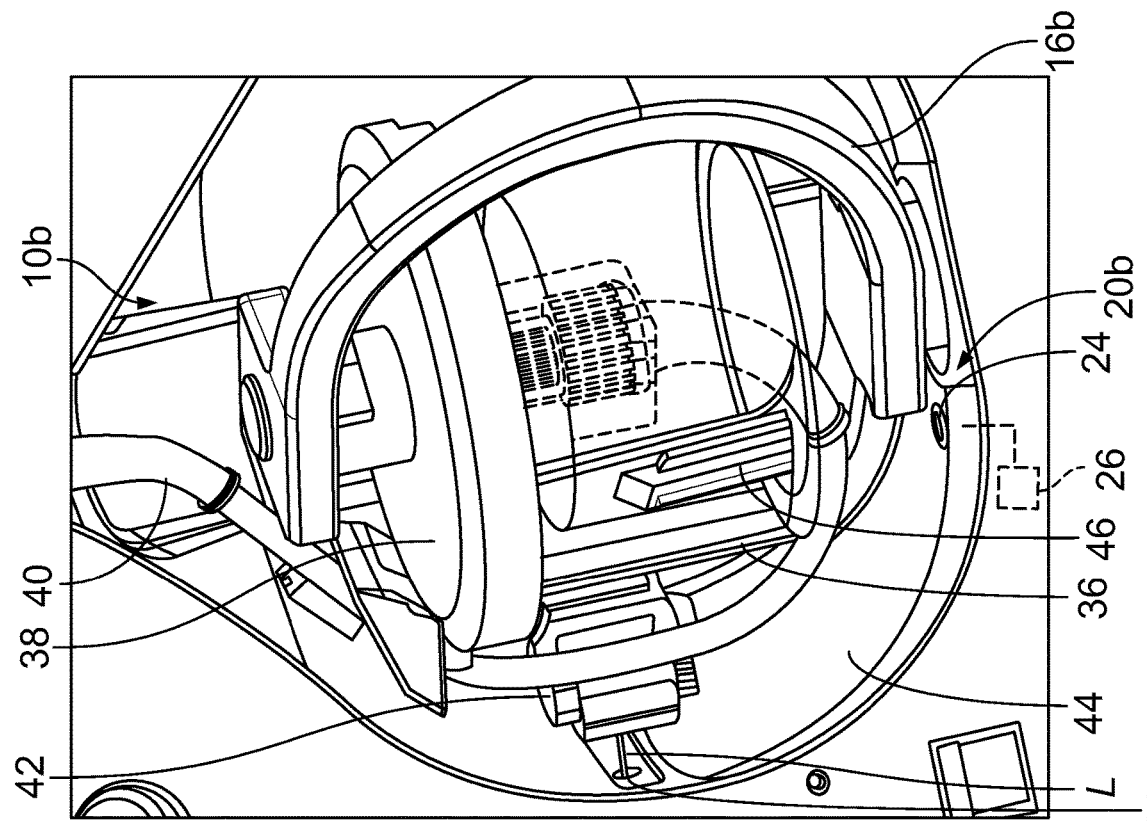
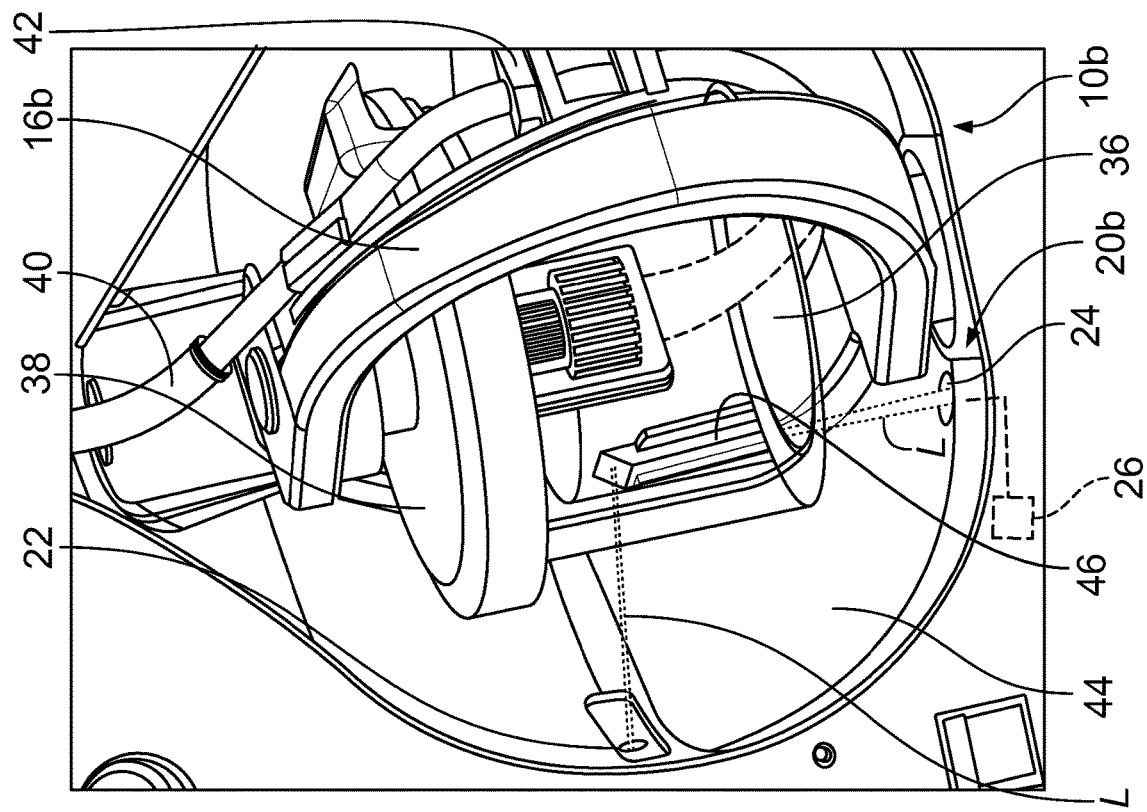

PREDICTING MALFUNCTION AND FAILURE OF CENTRIFUGE UMBILICUS

CROSS-REFERENCE TO RELATED APPLICATIONS

This application claims the benefit of and priority of U.S. Provisional Patent Application Ser. No. 63/144,485, filed Feb. 2, 2021, the contents of which are incorporated by reference herein.

BACKGROUND

Field of the Disclosure

The disclosure relates to umbilicus-driven centrifuges. More particularly, the disclosure relates to systems and methods for predicting malfunction or failure of the umbilicus of an umbilicus-driven centrifuge.

Description of Related Art

Various blood processing systems now make it possible to collect particular blood constituents, rather than whole blood, from a blood source. Typically, in such systems, whole blood is drawn from a blood source, the particular blood component or constituent is separated, removed, and collected, and the remaining blood constituents are returned to the blood source. Removing only particular constituents is advantageous when the blood source is a human donor or patient, because potentially less time is needed for the donor's body to return to pre-donation levels, and donations can be made at more frequent intervals than when whole blood is collected. This increases the overall supply of blood constituents, such as plasma and platelets, made available for transfer and/or therapeutic treatment.

Whole blood is typically separated into its constituents through centrifugation. This requires that the whole blood be passed through a centrifuge after it is withdrawn from, and before it is returned to, the blood source. To avoid contamination and possible infection (if the blood source is a human donor or patient), the blood is preferably contained within a sealed, sterile fluid flow system during the entire centrifugation process. Typical blood processing systems thus include a permanent, reusable assembly containing the hardware (centrifuge, drive system, pumps, valve actuators, programmable controller, and the like) that spins and pumps the blood, and a disposable, sealed, and sterile flow circuit that is mounted in cooperation on the hardware.

The centrifuge engages and spins the disposable flow circuit during a blood separation step. As the flow circuit is spun by the centrifuge, the heavier (greater specific gravity) components of the whole blood in the flow circuit, such as red blood cells, move radially outwardly away from the center of rotation toward the outer or "high-G" wall of the centrifuge. The lighter (lower specific gravity) components, such as plasma, migrate toward the inner or "low-G" wall of the centrifuge. Various ones of these components can be selectively removed from the whole blood by providing appropriately located channeling seals and outlet ports in the flow circuit. For example, in one blood separation procedure, plasma is separated from cellular blood components and collected, with the cellular blood components and a replacement fluid being returned to the blood source.

According to one known design, the centrifuge may be rotated about a rotational axis by an umbilicus. Umbilicus-driven centrifuges have been known since the 1970s, as described in U.S. Pat. No. 4,120,449, which is hereby incorporated herein by reference. In an umbilicus-based system, the centrifuge is connected to a first end of an umbilicus, while the opposite end of the umbilicus is spaced from the first end along the rotational axis of the centrifuge. The first end of the umbilicus is free to twist and rotate with the centrifuge, while the opposite end is held in place without rotating or twisting. A section of the umbilicus between its ends is orbited around the centrifuge by a yoke. The yoke and associated section of the umbilicus orbit around the rotational axis of the centrifuge at a speed that is commonly referred to as "one omega."

Due to one end of the umbilicus being fixed in place, the umbilicus tends to become twisted about its central axis as its central section is orbited about the rotational axis of the centrifuge by the yoke. However, the material composition of the umbilicus is such that it untwists itself, rather than kinking or otherwise becoming inoperative. This has the effect of increasing the rate at which the centrifuge spins, because the free end of the umbilicus (to which it is secured) is the only end of the umbilicus that may untwist to oppose the tendency of the umbilicus to become twisted. The yoke being rotated to orbit the central section of the umbilicus around the rotational axis of the centrifuge at the "one omega" speed combines with the action of the umbilicus to untwist about its own central axis to impart a "two omega" average rotational speed to the bowl and spool of the centrifuge, which is twice the "one omega" rotational speed of the yoke.

The status of fluid being separated in the centrifuge (namely, in the disposable flow circuit mounted within the centrifuge) is monitored by an optical monitoring system. According to one known approach, an optical monitoring system is mounted onto the yoke and, thus, rotates at the "one omega" speed, as described in U.S. Pat. No. 5,316,667, which is hereby incorporated herein by reference. According to an alternative approach, the optical monitoring system may be mounted to a stationary radial location, as described in U.S. Patent No. 2014/0045668; U.S. Pat. No. 10,561,784; and PCT Patent Application Publication No. WO 2018/053217 A1, each of which is hereby incorporated herein by reference.

Regardless of the particular configuration of the optical monitoring system, proper operation of the centrifuge is dependent upon the soundness of the umbilicus. If the umbilicus malfunctions or otherwise fails, the result can be significant noise or even blood spills. It is conventional to employ a liquid detector in the centrifuge to detect umbilicus leaks due to failure, but it would be advantageous to be able to predict umbilicus failure or malfunction before there is any leakage.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a centrifuge is configured for rotation of a separation chamber about a rotational axis by an umbilicus. The centrifuge includes a yoke configured to orbit a midsection of the umbilicus around the rotational axis at a first speed so as to cause the separation chamber to rotate about the rotational axis at a second speed that is approximately double the first speed. The centrifuge also includes an optical monitoring system configured to directly monitor the separation chamber, with the optical monitoring system including a light source, a light detector, and a controller. The light source is configured and oriented to emit a light toward the separation chamber, while the light detector is configured and oriented to receive at least a portion of the light from the light source after said light has passed through the separation chamber. The controller is configured to receive a plurality of signals from the light detector when the light detector receives said at least a portion of the light, with the controller being further configured to compare a period or frequency of the plurality of signals from the light detector to an expected period or frequency and determine that the umbilicus is experiencing an irregularity when the period is different from the expected period or the frequency is different from the expected frequency.

In another aspect, a method is provided for determining whether an umbilicus of an umbilicus-driven centrifuge is experiencing an irregularity. The method includes rotating a yoke about a rotational axis so as to orbit a midsection of an umbilicus around the rotational axis at a first speed, thereby causing a separation chamber to rotate at a second speed that is approximately double the first speed. Light is emitted toward the separation chamber, with at least a portion of the light being received after passing through the separation chamber. A period or frequency at which said at least a portion of said light is received is determined, with that period or frequency being compared to an expected period or frequency. It is determined that the umbilicus is experiencing an irregularity when the period is different from the expected period or the frequency is different from the expected frequency.

BRIEF DESCRIPTION OF THE DRAWINGS

FIG. 1 is a perspective view of selected components of an exemplary umbilicus-driven centrifuge, in accordance with an aspect of the present disclosure;

FIG. 2 is a side section view of components of an optical monitoring assembly of the centrifuge of FIG. 1;

FIG. 3 is a perspective view of another embodiment of an exemplary umbilicus-driven centrifuge according to an aspect of the present disclosure, with portions of a centrifuge bucket broken away for illustrative purposes;

FIG. 4 is a perspective view of yet another embodiment of an exemplary umbilicus-driven centrifuge according to an aspect of the present disclosure;

FIG. 5 is a perspective view of the centrifuge of FIG. 4, with light from a light source being blocked by a yoke of the centrifuge;

DESCRIPTION OF THE ILLUSTRATED EMBODIMENTS

Figure 6:
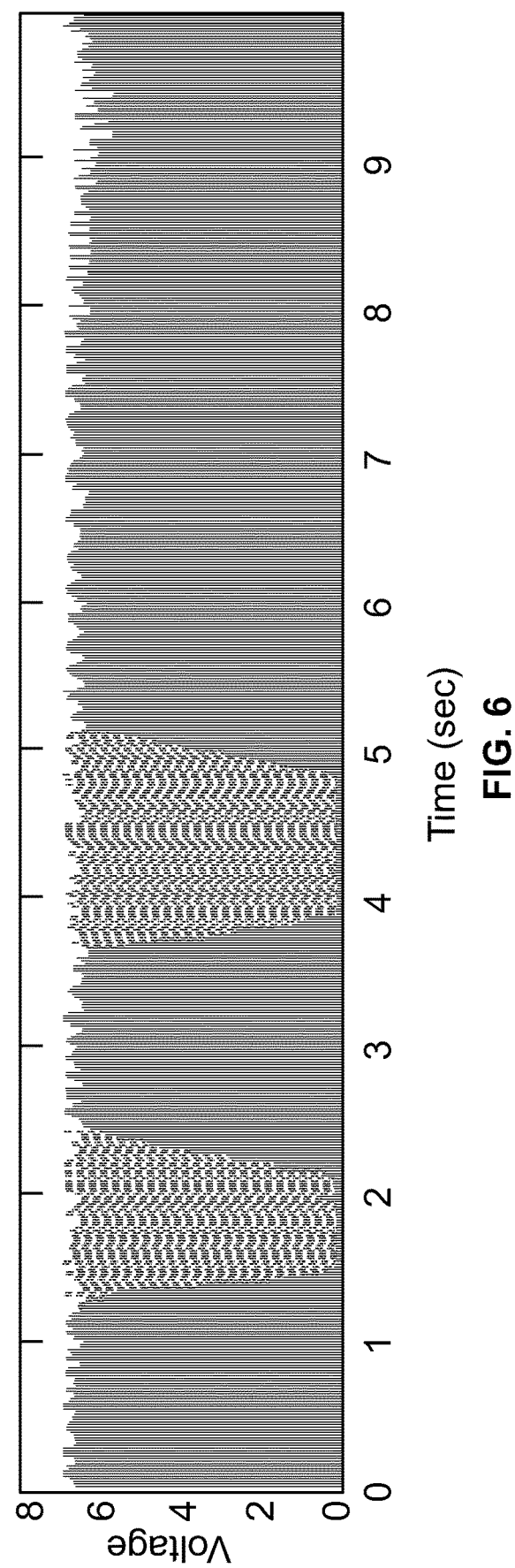
FIG. 6 is a chart showing signals received by a controller of a centrifuge while monitoring a separation chamber mounted within the centrifuge.

The embodiments disclosed herein are for the purpose of providing a description of the present subject matter, and it is understood that the subject matter may be embodied in various other forms and combinations not shown in detail. Therefore, specific embodiments and features disclosed herein are not to be interpreted as limiting the subject matter as defined in the accompanying claims.

According to the present disclosure, irregularities in an umbilicus of an umbilicus-driven centrifuge are assessed using the optical monitoring system of the centrifuge. Generally speaking, the optical monitoring system of a centrifuge will include a light source configured and oriented to emit a light toward a separation chamber associated with the umbilicus (as part of a common fluid flow circuit). The light from the light source will pass through the separation chamber before a portion of the light is received by a light detector of the optical monitoring system. When the light detector detects light from the light source, it transmits a signal to a controller of the optical monitoring system, which controls various aspects of the operation of the centrifuge based at least in part on the signals. Typically, the light detector will not continuously receive light from the light detector, but will only receive light periodically as a window or light-transmissive portion of the centrifuge is rotated into alignment with the light source, which allows the light to pass through the separation chamber and then to the light detector.

When the umbilicus is operating properly, the light detector will receive light from the light source at a regular, periodic frequency, such that the associated controller will similarly receive high-voltage signals from the light detector at a regular, periodic frequency. Indeed, while the exact period or frequency at which the light detector is expected to receive light from the light source of the optical monitoring system may vary depending on a number of factors (e.g., the configuration of the centrifuge and the rate at which the midsection of the umbilicus is orbited around the rotational axis), for any centrifuge and any operating conditions, it is possible to determine the regular, periodic frequency at which the light detector should be receiving light from the light source.

However, it has been found that, as an umbilicus begins to wear or break down (which may occur due to extensive run time, improper loading, or poor construction, for example), the mechanical properties that enable the spring-like ability of the umbilicus to untwist may become slower or inconsistent with each time that the midsection of the umbilicus is orbited around the rotational axis of the centrifuge. This degradation in the performance of the umbilicus affects the rate at which the separation chamber is rotated, which affects the times at which the light detector will receive light from the light source, leading to the light detector receiving light at times that differ from the expected period or frequency. Thus, when the light detector is receiving light at times that differ from the expected period or frequency (and, hence, when the controller is receiving signals from the light detector at times that differ from the expected period or frequency), it is indicative of the umbilicus experiencing some irregularity. Accordingly, the controller of the centrifuge may be configured to determine that the umbilicus is experiencing an irregularity of some sort when the controller is receiving signals at times that differ from the expected period or frequency. When the controller determines that the umbilicus is experiencing an irregularity, it may halt operation of the centrifuge to prevent leakage or catastrophic failure of the umbilicus.

As noted above, different centrifuges employ different optical monitoring systems and operate in ways that leads to different periods or frequencies at which light from the light source is received by the light detector. Accordingly, different embodiments of exemplary centrifuges and optical monitoring systems will be described herein, along with a description of how these predictive principles may be applied to such centrifuges and optical monitoring systems. However, it should be understood that the predictive principles described herein are not limited to any particular configuration of a centrifuge, but rather these principles may be applied to any suitably configured centrifuge.

FIGS. 1 and 2 illustrate a first exemplary embodiment of a centrifuge 10 to which the predictive principles described herein may be applied. In the embodiment of FIGS. 1 and 2, the centrifuge 10 includes an outer bowl 12 and an inner spool 14 (FIG. 2) that are pivoted on a yoke 16 (FIG. 1) between an operating position (FIG. 1) and a loading/unloading position. When in the loading/unloading position, the spool 14 can be moved at least partially out of the bowl 12, followed by a technician wrapping a flexible separation chamber (not illustrated) about the spool 14. Movement of the spool 14 back into the bowl 12 encloses the separation chamber for processing. When closed, the bowl 12 and spool 14 are pivoted into the operating position of FIG. 1 for rotation about a rotational axis of the centrifuge 10.

The yoke 16 is rotated by a motor (not illustrated) at a first rotational speed that is referred to herein as the "one omega" speed, which speed may vary, depending on the nature of the procedure being executed by the centrifuge 10. The yoke 16 engages a midsection of an umbilicus (not illustrated) associated with the separation chamber, causing the midsection of the umbilicus to orbit around the rotational axis. A first or upper end of the umbilicus aligned with the rotational axis is engaged by a holder (not illustrated), which prevents rotation of the upper end of the umbilicus. As the midsection of the umbilicus is rotated at the "one omega" speed, the umbilicus will become twisted (on account of the upper end not also rotating). The umbilicus is configured such that, upon becoming sufficiently twisted, it will resiliently untwist, which has the effect of causing the separation chamber (which is connected to a second or lower end of the umbilicus), the bowl 12, and the spool 14 to rotate at a second speed that is approximately double the "one omega" speed (and, is hence, referred to as the "two omega" speed).

A viewing head 18 of an optical monitoring system 20 is mounted to the yoke 16 and, thus, rotates at the same "one omega" speed as the yoke 16. On account of the viewing head 18 being mounted to the yoke 16, it will be seen that the optical monitoring system 20 is positioned radially inwardly of at least a portion of the yoke 16 with respect to the rotational axis. Notably, the optical monitoring system 20 is positioned radially inwardly of the holder of the yoke 16 that engages the midsection of the umbilicus, such that the umbilicus will never pass between the optical monitoring system 20 and the portion of the separation chamber observed by the optical monitoring system 20.

Referring to FIG. 2, the optical monitoring system 20 includes a light source 22, a light detector 24, and a controller 26. The light source 22 is configured and oriented to emit light toward the separation chamber received between the bowl 12 and the spool 14, with the nature of the light varying depending on the nature of the fluid being processed and the objectives of the procedure. In an exemplary embodiment, the light source 22 is configured to emit a light that is absorbed by red blood cells, which (when blood or another red blood cell-containing fluid is being separated) allows the optical monitoring system 20 to determine the location of an interface between separated red blood cells and a plasma constituent within the separation chamber. By way of example, a light source 22 configured as a circular array of red light emitting diodes may be employed, but other wavelengths absorbed by red blood cells, like green or infrared, could also be used.

The illustrated light detector 24 (FIG. 2) is mounted adjacent to the light source 22. In one embodiment, the light detector 24 comprises a PIN diode detector, which is located generally in the geometric center of the circular array of light emitting diodes of the light source 22. Other types of light detectors and/or light detectors positioned at different positions with respect to an associated light source may also be employed without departing from the scope of the present disclosure.

As for the controller 26, it may be variously configured without departing from the scope of the present disclosure. In one embodiment, the controller 26 comprises a main processing unit (MPU), which can comprise, e.g., a Pentium™ type microprocessor made by Intel Corporation, although other types of conventional microprocessors can be used. In the illustrated embodiment, the controller 26 is mounted inside the viewing head 18, but the controller 26 may be positioned elsewhere in other embodiments. This may include the controller 26 being mounted at a different location within the device housing the centrifuge 10 or in an entirely separate device, with signals from the light detector 24 being wirelessly transmitted to the controller 26.

As noted above, the yoke 16 rotates the optical monitoring system 20 at a "one omega" speed, which causes the bowl 12 and spool 14 to rotate at a "two omega" speed. The light source 22 directs light onto the rotating bowl 12. In the illustrated embodiment, the bowl 12 is transparent to the light emitted by the light source 22 only in one particular window or region 28. The remainder of the bowl 12 that lies in the path of the light from the light source 22 comprises an opaque or light absorbing material.

The light from the light source 22 will thereby pass through the light-transmissive portion 28 of the bowl 12 and through the separation chamber every time the light source 22 and the light-transmissive portion 28 of the bowl 12 rotate into alignment. The illustrated spool 14 carries a light-reflective material 30 (FIG. 2) aligned with the light-transmissive portion 28 of the bowl 12 to enhance its reflective properties. The light-reflective material 30 of the spool 14 reflects incoming light received from the light source 22 out through the light-transmissive portion 28 of the bowl 12, where it is received by the light detector 24. In the illustrated embodiment, light passing toward the separation chamber from the light source 22 and then reflected back toward the light detector 24 passes through a focusing lens 32 (FIG. 2), which forms a part of the viewing head 18.

As the light-transmissive portion 28 of the bowl 12 comes into alignment with the light source 22, the light detector 24 will first sense light reflected through the separation chamber. In the case of blood separation, the light will first pass through a separated plasma layer within the separation chamber, with a red blood cell layer eventually being rotated into alignment with the light source 22. The red blood cell layer absorbs light from the light source 22 and thereby reduces the previously sensed intensity of the reflected light. The intensity of the reflected light sensed by the light detector 24 (and the magnitude or voltage of the resulting signal transmitted from the light detector 24 to the controller 26) represents the amount of light from the light source 22 that is not absorbed by the red blood cell layer. With this information, the controller 26 can determine the location of the interface between the separated plasma and red blood cell layers. It should be understood that this function of the optical monitoring system 20 is merely exemplary and that optical monitoring systems according to the present disclosure may be configured to determine other characteristics of a separation chamber and/or a fluid present in the separation chamber.

Additional details regarding the structure and operation of a centrifuge and fluid flow circuit (including a separation chamber and umbilicus) of the type shown in FIGS. 1 and 2 are described in U.S. Pat. No. 9,314,562, which is hereby incorporated herein by reference.

On account of the optical monitoring system 20 and the separation chamber being rotated about the rotational axis at substantial uniform, but different rates, the light detector 24 will periodically receive reflected light that has passed through the separation chamber when the umbilicus is operating properly. Similarly, the light detector 24 will transmit high-voltage signals (indicative of the light detector 24 receiving reflected light) to the controller 26 at a regular, predictable period or frequency. Thus, when the controller 26 is receiving high-voltage signals at a different period or frequency (which will tend to be less frequent than expected), it can determine that the umbilicus is experiencing an irregularity of some sort and take the appropriate steps, which would typically include stopping the procedure and alerting the technician.

FIG. 3 illustrates another exemplary embodiment of a centrifuge 10a to which the predictive principles described herein may be applied. It will be seen that the bowl 12 and yoke 16 of FIG. 3 are similarly configured to the bowl 12 and yoke 16 of the centrifuge 10 of FIGS. 1 and 2, with the one difference being that there is no viewing head mounted to the yoke 16 of FIG. 3. Instead, the light source 22 and light detector 24 of the optical monitoring system 20a are mounted to a stationary surface or component of the centrifuge 10a, with FIG. 3 showing the light source 22 and light detector 24 mounted to a surface of the centrifuge bucket 34. While FIG. 3 shows a simplified version of the optical monitoring system 20a, a more detailed discussion of such an optical monitoring system can be found in PCT Patent Application Publication No. WO 2014/039091 A1, which is hereby incorporated herein by reference.

In the embodiment of FIG. 3, the yoke 16 will orbit a midsection of an umbilicus (not illustrated) about a rotational axis of the centrifuge at the "one omega" speed, with the untwisting action of the umbilicus acting to cause an associated separation chamber (mounted within the bowl 12) to rotate at a "two omega" speed, as in the embodiment of FIGS. 1 and 2. The light-transmissive portion 28 of the bowl 12 will periodically rotate into alignment with the light source 22, at which time the light from the light source 22 will pass through the separation chamber and be reflected back toward the optical monitoring system 20a by a reflective surface of the spool positioned radially inwardly of the separation chamber, in accordance with the above description of the embodiment of FIGS. 1 and 2. At least a portion of the reflected light is received by the light detector 24, which then transmits a high-voltage signal to an associated controller 26, as described above.

On account of the optical monitoring system 20a being mounted to a stationary surface, the period and frequency at which the light-transmissive portion 28 of the bowl 12 rotates into alignment with the light source 22 will be different from the period and frequency in the embodiment of FIGS. 1 and 2 (in which the optical monitoring system 20 rotates at the "one omega" speed with the yoke 16). However, the rotation of the bowl 12, spool, and separation chamber is predictable when the umbilicus is operating properly, such that the period and frequency at which the light detector 24 receives reflected light (and, hence, the period and frequency at which the controller 26 receives high-voltage signals from the light detector 24) will be regular or periodic and predictable, as described above with regard to the embodiment of FIGS. 1 and 2. Thus, when the controller 26 is receiving high-voltage signals at times that differ from the expected period or frequency (which will tend to be less frequent than expected), it can determine that the umbilicus is experiencing an irregularity of some sort and take the appropriate steps, which would typically include stopping the procedure and alerting the technician.

It will be seen that, due to the optical monitoring system 20a being positioned radially outwardly of the yoke 16 with respect to the rotational axis, the umbilicus and yoke 16 will periodically pass between the optical monitoring system 20a and the bowl 12. If the umbilicus or yoke 16 is ever positioned between the optical monitoring system 20a and the light-transmissive portion 28 of the bowl 12 (which should not occur when the umbilicus is operating properly), the umbilicus or yoke 16 may at least partially prevent the light emitted by the light source 22 from reaching the separation chamber and being reflected back toward the light detector 24. Thus, in addition to an irregularly operating umbilicus affecting the rotational rate of the separation chamber (which change the period and frequency at which the controller 26 receives high-voltage signals from the light detector 24, as described above with regard to the embodiment of FIGS. 1 and 2), it is also possible that an irregularly operating umbilicus may block light that would otherwise be capable of passing through the separation chamber. Accordingly, it will be seen that an irregularly operating umbilicus may cause a change in the period and frequency at which the controller 26 receives high-voltage signals from the light detector 24 in two ways for a centrifuge 10a having an optical monitoring system 20a mounted to a stationary surface, as in the embodiment of FIG. 3.

FIG. 4 illustrates yet another exemplary embodiment of a centrifuge 10b to which the predictive principles described herein may be applied. The centrifuge 10b of FIG. 4 differs from the embodiments of FIGS. 1-3 to the extent that it is used in combination with a separation chamber 36 formed of a generally rigid material, rather than a flexible or deformable separation chamber (as in the embodiments of FIGS. 1-3). Due to the separation chamber 36 being formed of a generally rigid material, it is associated to a yoke 16b of the centrifuge 10b by a lid or cover 38, rather than being mounted between a bowl and a spool. Despite this difference, the umbilicus 40 of FIG. 4 may be similarly configured to the umbilicus used in the embodiments of FIGS. 1-3, with a midsection of the umbilicus 40 being engaged by a holder 42 of the yoke 16b and orbited around a rotational axis of the centrifuge 10b at a "one omega" speed. The above-described untwisting of the umbilicus 40 acts to cause the separation chamber 36 connected to the umbilicus 40 to rotate at a "two omega" speed that is approximately double the "one omega" speed.

The centrifuge 10b of FIG. 4 is similar to the centrifuge 10a of FIG. 3, in that it includes an optical monitoring system 20b mounted to a stationary surface 44 of the centrifuge 10b, but differs in that it positions the light source 22 and light detector 24 at different locations. In particular, the light source 22 is mounted to the centrifuge bucket 44 at a position that is radially outward of the yoke 16b, as in the embodiment of FIG. 3. However, rather than the light detector 24 being positioned adjacent to the light source 22, it is instead positioned beneath the yoke 16b and the separation chamber 36 (in the orientation of FIG. 4). Thus, to reach the light detector 24, light "L" from the light source 22 must be redirected perpendicularly from its initial direction, or from a direction that is generally perpendicular to the rotational axis of the centrifuge 10b to a direction that is generally parallel to the rotational axis.

The redirection of the light L may be achieved according to any suitable approach (e.g., using a mirror), with the illustrated embodiment employing a prismatic reflector 46 of the type described in greater detail in POT Patent Application Publication No. WO 2018/053217 A1. Briefly, the prismatic reflector 46 is mounted to or incorporated into the separation chamber 36 at a position that is radially inward of a fluid flow channel defined by the separation chamber 36. The separation chamber 36 may be formed of a transparent or translucent material, such that any light L from the light source 22 reaching the separation chamber 36 will pass through the separation chamber 36. However, the light L passing through the separation chamber 36 will not be redirected in the direction of the light detector 24 unless it is intercepted by the prismatic reflector 46. When the prismatic reflector 46 (which extends only along an arc corresponding to a region of the fluid flow channel to be monitored by the optical monitoring system 20b) is rotated into the path of the light L from the light source 22, at least a portion of the light L passes through the channel and reaches the prismatic reflector 46. The light L that reaches the prismatic reflector 46 is redirected perpendicularly to its original path, to be received by the light detector 24 (as shown in FIG. 4), which then transmits a high-voltage signal to an associated controller 26.

On account of the optical monitoring system 20b being mounted to a stationary surface, the period and frequency at which the prismatic reflector 46 rotates into alignment with the light source 22 will be similar to the period and frequency in the embodiment of FIG. 3 and will be similarly predictable, periodic, and regular. Thus, when the controller 26 is receiving high-voltage signals at times that differ from the expected period or frequency (which will tend to be less frequent than expected), it can determine that the umbilicus 40 is experiencing an irregularity of some sort and take the appropriate steps, which would typically include stopping the procedure and alerting the technician.

As described above with regard to the embodiment of FIG. 3, due to the light source 22 being positioned radially outwardly of the yoke 16b with respect to the rotational axis, the umbilicus 40 and yoke 16b will periodically pass between the light source 22 and the separation chamber 36. If the umbilicus 40 or yoke 16b is ever positioned between the light source 22 and the separation chamber 36 when the light source 22 is aligned with the prismatic reflector 46 (which should not occur when the umbilicus 40 is operating properly), the umbilicus 40 or yoke 16b may at least partially prevent the light L from reaching the separation chamber 36, as shown in FIG. 5. Thus, as described above with regard to the embodiment of FIG. 3, it will be seen that an irregularly operating umbilicus 40 may cause a change in the period and frequency at which the controller 26 receives high-voltage signals from the light detector 24 in two ways for a centrifuge 10b having an optical monitoring system 20b with components mounted to stationary surfaces, as in the embodiment of FIG. 4.

Turning now to more particular approaches to assessing an irregularity, FIG. 6 shows an example of an optical signal measurement over time that is indicative of an umbilicus that is not functioning properly. Each line in the plot of FIG. 6 displays a single signal measurement. The sections with higher signal frequencies (which occur between 0 and approximately 1.5 seconds, between approximately 2.25 and 3.75 seconds, and between approximately 4.75 and 10 seconds) represent signals measured at a frequency of "two omega," which is the expected frequency in the illustrated embodiment. The sections with lower signal frequencies (which occur between approximately 1.5 and approximately 2.25 seconds and between approximately 3.75 and approximately 4.75 seconds) represent signals from a light detector received by the associated controller at a frequency of "one omega," indicating that the signal is being received every other rotation due to light from the light source being blocked, as described above and shown in FIG. 5.

Figure 7:
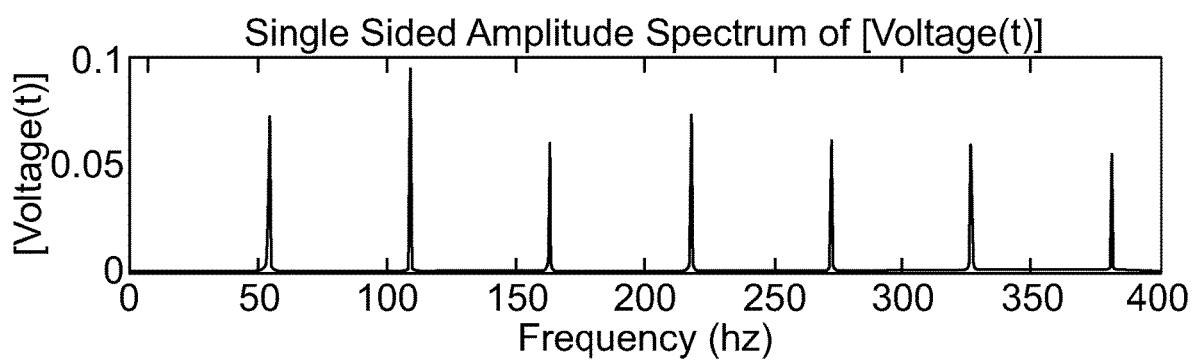
FIG. 7 is a chart isolating the signals from FIG. 6 that are received by the controller at an expected period or frequency.
Figure 8:
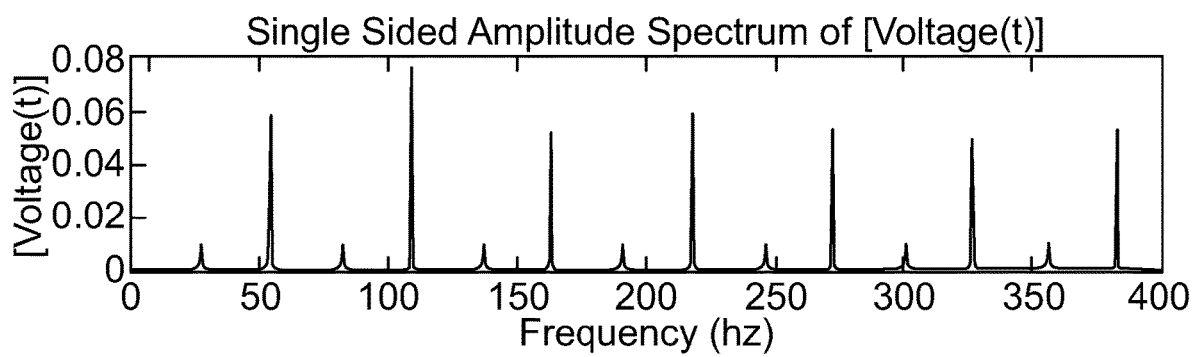
FIG. 8 is a chart isolating the signals from FIG. 6 that are received by the controller at both an expected period or frequency and a period or frequency that is different from the expected period or frequency.

During normal operation of the umbilicus in this illustrated embodiment, the signal detection is expected to continuously occur at a "two omega" frequency and, thus, a Fast Fourier Transform (FFT) analysis of the signal will show only the "two omega" frequency, as shown in FIG. 7, which (when the separation chamber is rotated at 3,280 RPM, as in the illustrated example) is equal to 54.67 hz. However, when the umbilicus begins to exhibit irregularities, signal-blocking will occur, and the frequency of the detected signal will change over time, as shown in FIG. 6. An FFT analysis of the entire signal in FIG. 6 will display both the "two omega" frequency (54.67 hz) and the "one omega" frequency (27.33 hz), as shown in FIG. 8. It should be noted that additional frequencies shown in FIGS. 7 and 8 are harmonics of the main "one omega" and "two omega" frequencies. Therefore, as illustrated by this example, a continuous frequency analysis of the optical signal received by the controller throughout a procedure can be applied to detect when the yoke or umbilicus may be blocking light from the light source, which is likely indicative of the umbilicus nearing catastrophic failure, meaning that the procedure can be stopped.

Although the illustrated example of FIGS. 6-8 displays a dramatic change in the signal frequency due to blocking of the light by the yoke or umbilicus, the principles described herein may also be applied to detect small changes in the signal frequency, if present. For example, in the case of a light source that is not positioned radially outwardly of the yoke (as in the embodiment of FIGS. 1 and 2), it is not possible for the light to be blocked by the yoke or umbilicus. However, variations in the period of the signal over time may indicate an umbilicus that is untwisting slowly or inconsistently, signifying a malfunction or irregularity.

Figure 9:
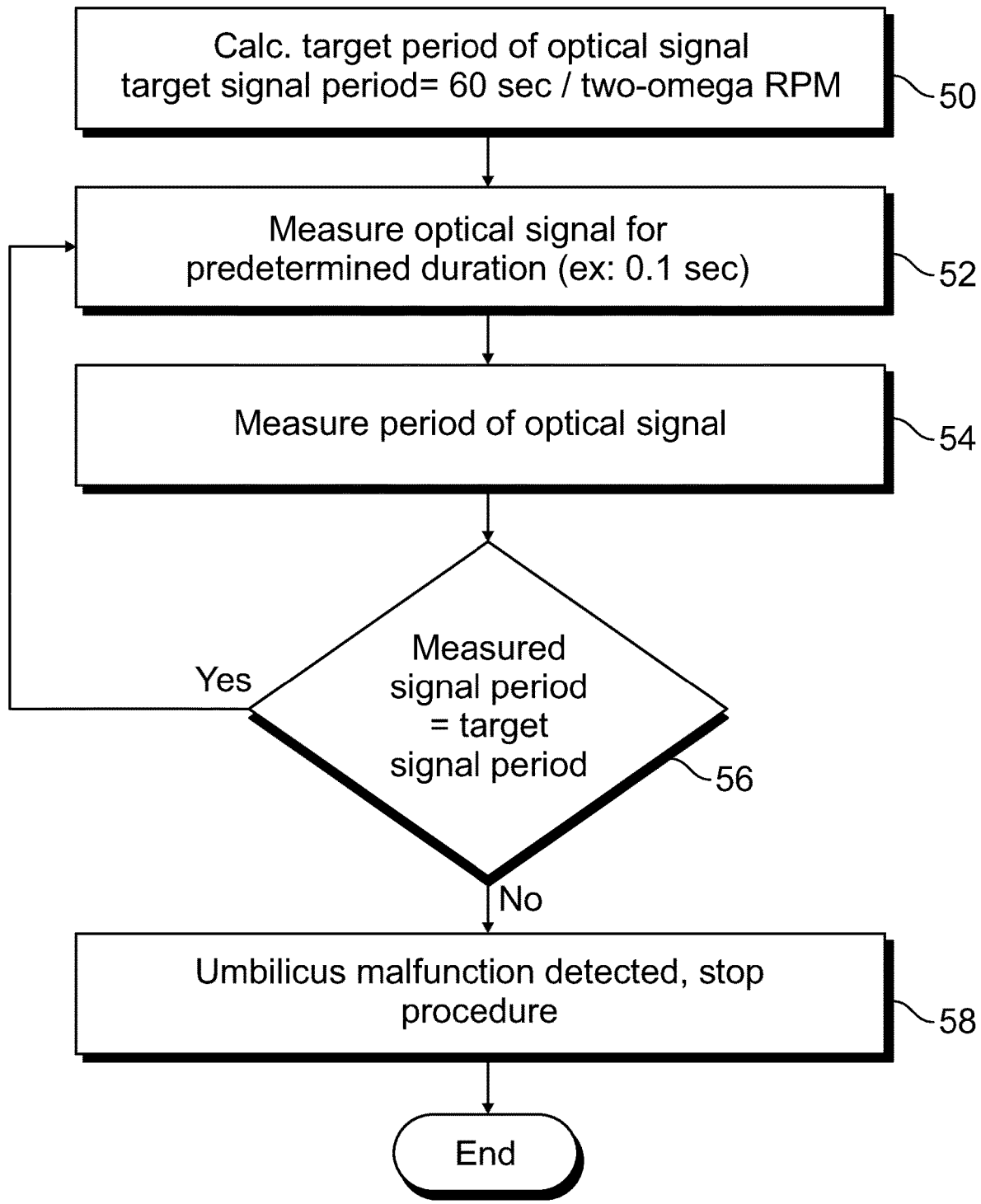
FIG. 9 is a flowchart of an exemplary embodiment of an approach to predicting umbilicus irregularity, according to an aspect of the present disclosure.
Figure 10:
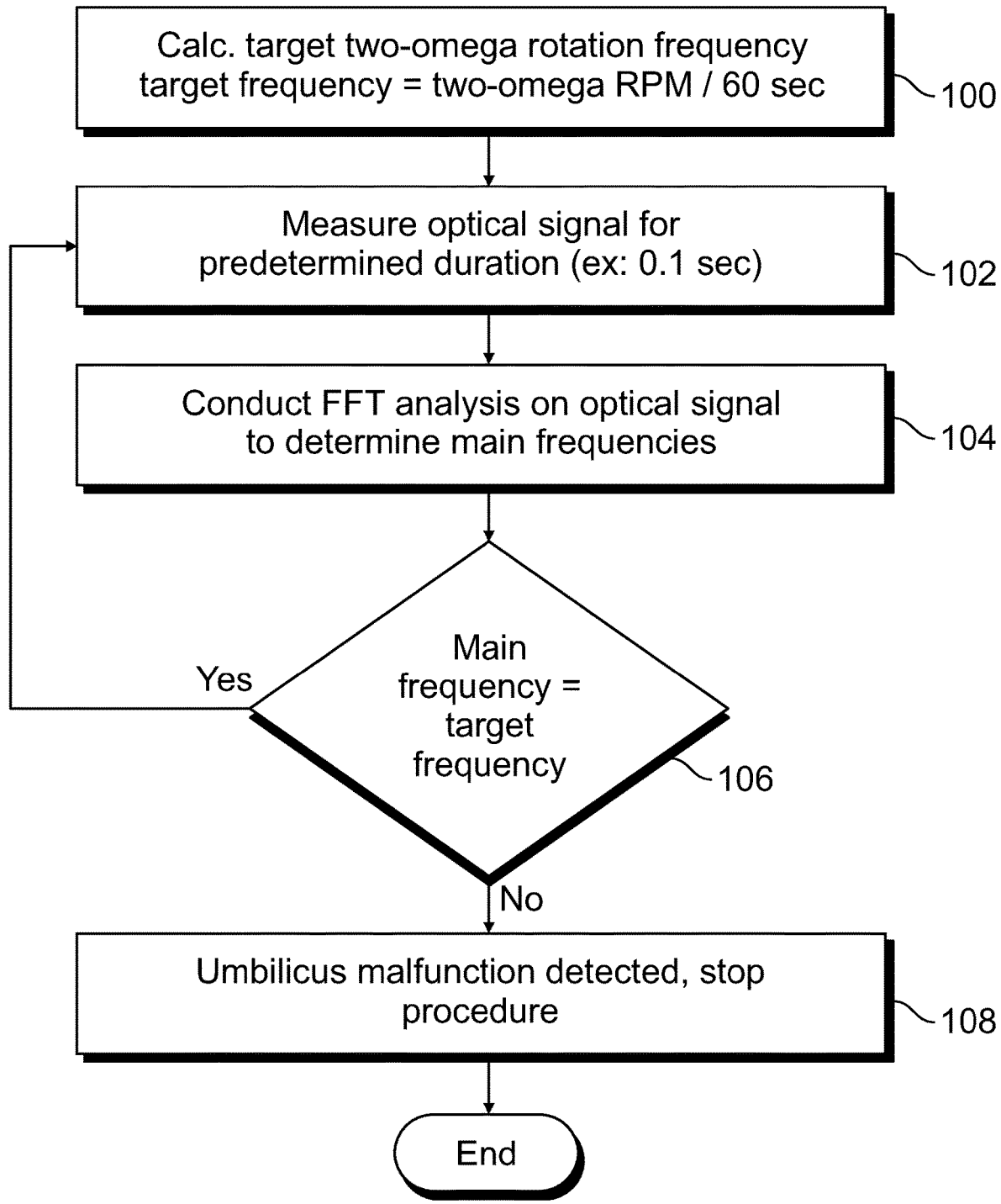
FIG. 10 is a flowchart of another exemplary embodiment of an approach to predicting umbilicus irregularity, according to an aspect of the present disclosure.

FIGS. 9 and 10 display flow charts of exemplary algorithms that may be executed by a controller when attempting to predict umbilicus failure. FIG. 9 shows an approach whereby a target signal period is first determined (at step 50). In the illustrated example, the target signal period is determined by dividing sixty seconds by the "two omega" speed at which the separation chamber is to be rotated, but it should be understood that the target signal period may vary for differently configured centrifuges.

Next (as shown at step 52), the controller measures the optical signal from the light detector for a predetermined duration, which is 0.1 seconds in the illustrated embodiment.

The controller measures the period of the optical signal (at step 54) and compares the measured signal period to the target signal period (at step 56). If the measured signal period is equal to the target signal period, the controller determines that the umbilicus is not experiencing an irregularity. In that case, the controller returns to step 52 and continues the cycle of measuring the optical signal (step 52), measuring the period of the signal (step 54), and comparing the measured signal to the target period (step 56). So long as the measured signal period remains equal to the target signal period (indicative of the umbilicus operating properly), the controller will not exit this cycle, such that the cycle will be repeated until the algorithm is interrupted by some other command (e.g., upon a separation procedure being completed).

When the controller determines that the measured signal period is not equal to the target period (typically, when the measured signal period is greater than the target or expected period), it diagnoses the umbilicus as experiencing an irregularity or malfunction (at step 58). Upon diagnosing an irregularity or malfunction, the controller may proceed with any of a number of possible reactions, including stopping the procedure (as in FIG. 9) and/or alerting the technician of a possible malfunction.

The algorithm of FIG. 10 is similar to the algorithm of FIG. 9, but employs a FFT frequency analysis, whereas the algorithm of FIG. 9 determines variable frequencies by continuously measuring the signal period. During a first step 100, the target or expected frequency is determined. In the illustrated example, a target frequency is determined by dividing the "two omega" speed at which the separation chamber is to be rotated by sixty seconds, but it should be understood that the target or expected frequency may vary for differently configured centrifuges.

Next (as shown at step 102), the controller measures the optical signal from the light detector for a predetermined duration, which is 0.1 seconds in the illustrated embodiment. The controller carries out a FFT analysis on the optical signal to determine main frequencies (at step 104) and compares the main frequency to the target or expected frequency (at step 106). If the main frequency is equal to the target or expected frequency, the controller determines that the umbilicus is not experiencing an irregularity. In that case, the controller returns to step 102 and continues the cycle of measuring the optical signal (step 102), determining the main frequency of the signal (step 104), and comparing the main frequency to the target or expected frequency (step 106). So long as the main frequency remains equal to the target or expected frequency (indicative of the umbilicus operating properly), the controller will not exit this cycle, such that the cycle will be repeated until the algorithm is interrupted by some other command (e.g., upon a separation procedure being completed).

When the controller determines that the main frequency is not equal to the target or expected frequency (typically, when a main frequency is less than the target or expected frequency), it diagnoses the umbilicus as experiencing an irregularity or malfunction (at step 108). Upon diagnosing an irregularity or malfunction, the controller may proceed with any of a number of possible reactions, including stopping the procedure (as in FIG. 10) and/or alerting the technician of a possible malfunction.

Although the two approaches of FIGS. 9 and 10 perform the same task, the approach employing a FFT analysis (FIG. 10) provides a more robust, but also more complicated, calculation. Thus, if a more simplified calculation is preferred (or if variations in the period between rotations are of interest), the method evaluating the signal period (as in FIG. 9) may be employed. However, it should be understood that the illustrated algorithms are merely exemplary and that other approaches using the predictive principles described herein may be employed to predict umbilicus failure or malfunction without departing from the scope of the present disclosure.

Aspects

Aspect 1. A centrifuge configured for rotation of a separation chamber about a rotational axis by an umbilicus, comprising: a yoke configured to orbit a midsection of the umbilicus around the rotational axis at a first speed so as to cause the separation chamber to rotate about the rotational axis at a second speed that is approximately double the first speed; and an optical monitoring system configured to directly monitor the separation chamber, the optical monitoring system including a light source configured and oriented to emit a light toward the separation chamber, a light detector configured and oriented to receive at least a portion of the light from the light source after said light has passed through the separation chamber, and a controller configured to receive a plurality of signals from the light detector when the light detector receives said at least a portion of the light, wherein the controller is further configured to compare a period or frequency of the plurality of signals from the light detector to an expected period or frequency and determine that the umbilicus is experiencing an irregularity when the period is different from the expected period or the frequency is different from the expected frequency.

Aspect 2. The centrifuge of Aspect 1, wherein the expected period or frequency is a substantially uniform period or frequency.

Aspect 3. The centrifuge of any one of the preceding Aspects, wherein the expected period or frequency is based upon said second speed.

Aspect 4. The centrifuge of any one of the preceding Aspects, wherein the expected period or frequency is based upon the expectation that the light detector receives said at least a portion of the light once for each complete rotation of the separation chamber about the rotational axis.

Aspect 5. The centrifuge of any one of the preceding Aspects, wherein the controller is configured to determine that umbilicus is experiencing an irregularity when the frequency is less than the expected frequency or when the period is greater than the expected period.

Aspect 6. The centrifuge of any one of the preceding Aspects, wherein the controller is configured to execute a fast Fourier transform analysis of the plurality of signals from the light detector when determining whether the umbilicus is experiencing an irregularity.

Aspect 7. The centrifuge of any one of the preceding Aspects, wherein the light source is positioned radially outwardly of at least a portion of the yoke with respect to the rotational axis.

Aspect 8. The centrifuge of Aspect 7, wherein the light detector is configured and oriented to receive light redirected from the separation chamber in a direction generally parallel to a direction in which said light is emitted by the light source.

Aspect 9. The centrifuge of Aspect 7, wherein the light detector is configured and oriented to receive light redirected from the separation chamber in a direction generally perpendicular to a direction in which said light is emitted by the light source.

Aspect 10. The centrifuge of any one of Aspects 1-6, wherein the light source is positioned radially inwardly of at least a portion of the yoke with respect to the rotational axis.

Aspect 11. A method of determining whether an umbilicus of an umbilicus-driven centrifuge is experiencing an irregularity, the method comprising: rotating a yoke about a rotational axis so as to orbit a midsection of an umbilicus around the rotational axis at a first speed, thereby causing a separation chamber to rotate at a second speed that is approximately double the first speed; emitting a light toward the separation chamber; receiving at least a portion of said light after said light has passed through the separation chamber; determining a period or frequency at which said at least a portion of said light is received; comparing said period or frequency to an expected period or frequency; and determining that the umbilicus is experiencing an irregularity when the period is different from the expected period or the frequency is different from the expected frequency.

Aspect 12. The method of Aspect 11, wherein the expected period or frequency is a substantially uniform period or frequency.

Aspect 13. The method of any one of Aspects 11-12, wherein the expected period or frequency is based upon said second speed.

Aspect 14. The method of any one of Aspects 11-13, wherein the expected period or frequency is based upon the expectation that said at least a portion of the light is received once for each complete rotation of the separation chamber about the rotational axis.

Aspect 15. The method of any one of Aspects 11-14, wherein said determining hat the umbilicus is experiencing an irregularity when the period is different from the expected period or the frequency is different from the expected frequency comprises determining that the umbilicus is experiencing an irregularity when the frequency is less than the expected frequency or the period is greater than the expected period.

Aspect 16. The method of any one of Aspects 11-15, wherein said determining the period or frequency at which said at least a portion of said light is received includes executing a fast Fourier transform analysis.

Aspect 17. The method of any one of Aspects 11-16, wherein said emitting the light toward the separation chamber includes emitting the light from a position radially outward of at least a portion of the yoke with respect to the rotational axis.

Aspect 18. The method of Aspect 17, wherein said receiving said at least a portion of said light after said light has passed through the separation chamber includes receiving light redirected from the separation chamber in a direction generally parallel to a direction in which said light is emitted toward the separation chamber.

Aspect 19. The method of Aspect 17, wherein said receiving said at least a portion of said light after said light has passed through the separation chamber includes receiving light redirected from the separation chamber in a direction generally perpendicular to a direction in which said light is emitted toward the separation chamber.

Aspect 20. The method of any one of Aspects 11-16, wherein said emitting the light toward the separation chamber includes emitting the light from a position radially inward of at least a portion of the yoke with respect to the rotational axis.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A centrifuge configured for rotation of a separation chamber about a rotational axis by an umbilicus, comprising:
   a yoke configured to orbit a midsection of the umbilicus around the rotational axis at a first speed so as to cause the separation chamber to rotate about the rotational axis at a second speed that is approximately double the first speed; and
   an optical monitoring system configured to directly monitor the separation chamber, the optical monitoring system including
      a light source configured and oriented to emit a light toward the separation chamber,
      a light detector configured and oriented to receive at least a portion of the light from the light source after said light has passed through the separation chamber, and
      a controller configured to receive a plurality of signals from the light detector when the light detector receives said at least a portion of the light, wherein the controller is further configured to compare a period or frequency of the plurality of signals from the light detector to an expected period or frequency and determine that the umbilicus is experiencing an irregularity when the period is different from the expected period or the frequency is different from the expected frequency.

2. The centrifuge of claim 1, wherein the expected period or frequency is a substantially uniform period or frequency.

3. The centrifuge of claim 1 wherein the expected period or frequency is based upon said second speed.

4. The centrifuge of claim 1, wherein the expected period or frequency is based upon the expectation that the light detector receives said at least a portion of the light once for each complete rotation of the separation chamber about the rotational axis.

5. The centrifuge of claim 1, wherein the controller is configured to determine that umbilicus is experiencing an irregularity when the frequency is less than the expected frequency or when the period is greater than the expected period.

6. The centrifuge of claim 1, wherein the controller is configured to execute a fast Fourier transform analysis of the plurality of signals from the light detector when determining whether the umbilicus is experiencing an irregularity.

7. The centrifuge of claim 1, wherein the light source is positioned radially outwardly of at least a portion of the yoke with respect to the rotational axis.

8. The centrifuge of claim 7, wherein the light detector is configured and oriented to receive light redirected from the separation chamber in a direction generally parallel to a direction in which said light is emitted by the light source.

9. The centrifuge of claim 7, wherein the light detector is configured and oriented to receive light redirected from the separation chamber in a direction generally perpendicular to a direction in which said light is emitted by the light source.

10. The centrifuge of claim 1, wherein the light source is positioned radially inwardly of at least a portion of the yoke with respect to the rotational axis.

11. A method of determining whether an umbilicus of an umbilicus-driven centrifuge is experiencing an irregularity, the method comprising:
rotating a yoke about a rotational axis so as to orbit a midsection of an umbilicus around the rotational axis at a first speed, thereby causing a separation chamber to rotate at a second speed that is approximately double the first speed;
emitting a light toward the separation chamber;
receiving at least a portion of said light after said light has passed through the separation chamber;
determining a period or frequency at which said at least a portion of said light is received;
comparing said period or frequency to an expected period or frequency; and
determining that the umbilicus is experiencing an irregularity when the period is different from the expected period or the frequency is different from the expected frequency.

12. The method of claim 11, wherein the expected period or frequency is a substantially uniform period or frequency.

13. The method of claim 11, wherein the expected period or frequency is based upon said second speed.

14. The method of claim 11, wherein the expected period or frequency is based upon the expectation that said at least a portion of the light is received once for each complete rotation of the separation chamber about the rotational axis.

15. The method of claim 11, wherein said determining that the umbilicus is experiencing an irregularity when the period is different from the expected period or the frequency is different from the expected period or frequency comprises determining that the umbilicus is experiencing an irregularity when the frequency is less than the expected frequency or the period is greater than the expected period.

16. The method of claim 11, wherein said determining the period or frequency at which said at least a portion of said light is received includes executing a fast Fourier transform analysis.

17. The method of claim 11, wherein said emitting the light toward the separation chamber includes emitting the light from a position radially outward of at least a portion of the yoke with respect to the rotational axis.

18. The method of claim 17, wherein said receiving said at least a portion of said light after said light has passed through the separation chamber includes receiving light redirected from the separation chamber in a direction generally parallel to a direction in which said light is emitted toward the separation chamber.

19. The method of claim 17, wherein said receiving said at least a portion of said light after said light has passed through the separation chamber includes receiving light redirected from the separation chamber in a direction generally perpendicular to a direction in which said light is emitted toward the separation chamber.

20. The method of claim 11, wherein said emitting the light toward the separation chamber includes emitting the light from a position radially inward of at least a portion of the yoke with respect to the rotational axis.

\* \* \* \* \*